US006809169B2

(12) United States Patent
Byrd et al.

(10) Patent No.: US 6,809,169 B2
(45) Date of Patent: Oct. 26, 2004

(54) POLYSILOXANE COATINGS FOR SURFACES

(75) Inventors: Norman R. Byrd, Villa Park, CA (US); Steven G. Keener, Trabuco Canyon, CA (US); Edward David Lally, Long Beach, CA (US); Cesare Peralta, Corona, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/455,070

(22) Filed: Jun. 5, 2003

(65) Prior Publication Data

US 2003/0232201 A1 Dec. 18, 2003

Related U.S. Application Data

(63) Continuation-in-part of application No. 10/436,015, filed on May 12, 2003, which is a continuation-in-part of application No. 10/164,826, filed on Jun. 7, 2002, now abandoned.

(51) Int. Cl.$^7$ .............................................. C08G 77/26

(52) U.S. Cl. ........................... 528/28; 528/31; 428/447; 427/387

(58) Field of Search .............................. 528/31, 32, 28; 428/447; 427/387

(56) References Cited

U.S. PATENT DOCUMENTS

| 4,275,184 A | * | 6/1981 | Bargain et al. ................ 528/26 |
| 5,296,144 A | * | 3/1994 | Sternina et al. ............. 210/490 |
| 6,384,171 B1 | * | 5/2002 | Yamazaki et al. ............ 528/15 |

* cited by examiner

Primary Examiner—Margaret G. Moore
(74) Attorney, Agent, or Firm—Alston & Bird LLP

(57) ABSTRACT

The present invention is directed to a method for applying to a substrate having a faying surface, a polysiloxane-containing coating, preferably a polysiloxane(amide-ureide) coating capable of inhibiting corrosion as well as the accumulation of ice. One embodiment of the present invention is directed to a polysiloxane(amide-ureide) that forms a durable, long lasting, anti-corrosive and anti-ice coating when directed to a substrate faying surface.

64 Claims, 3 Drawing Sheets

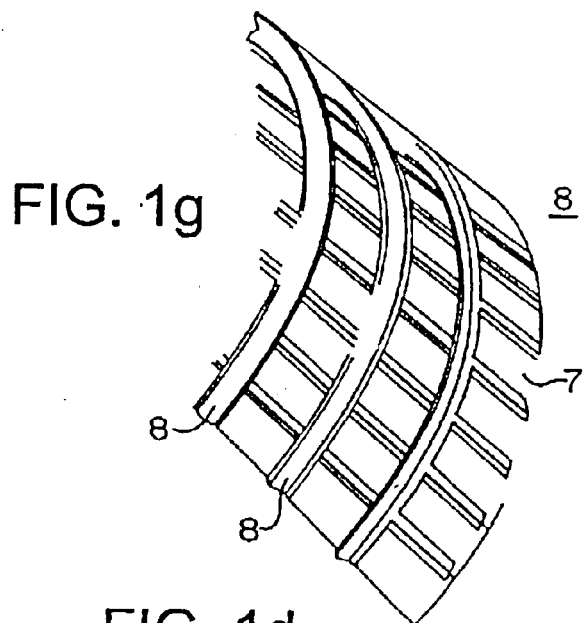
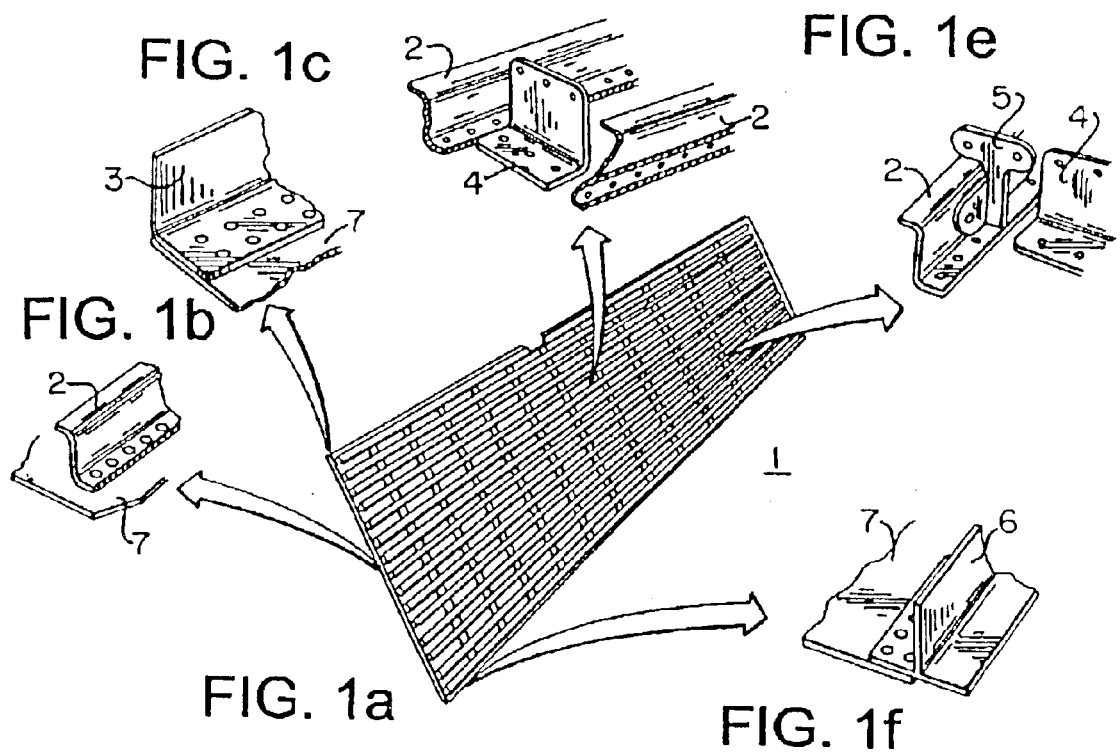

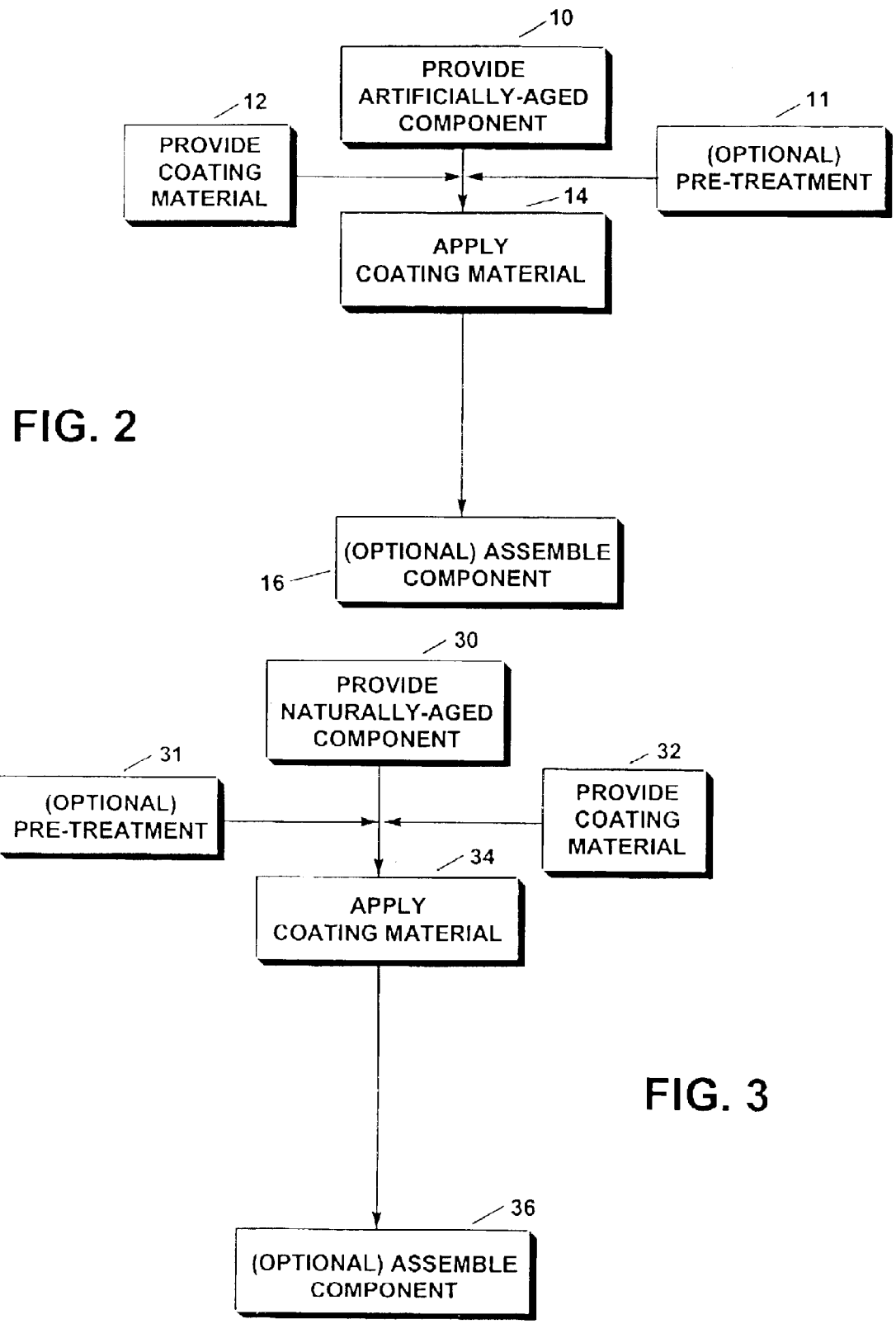

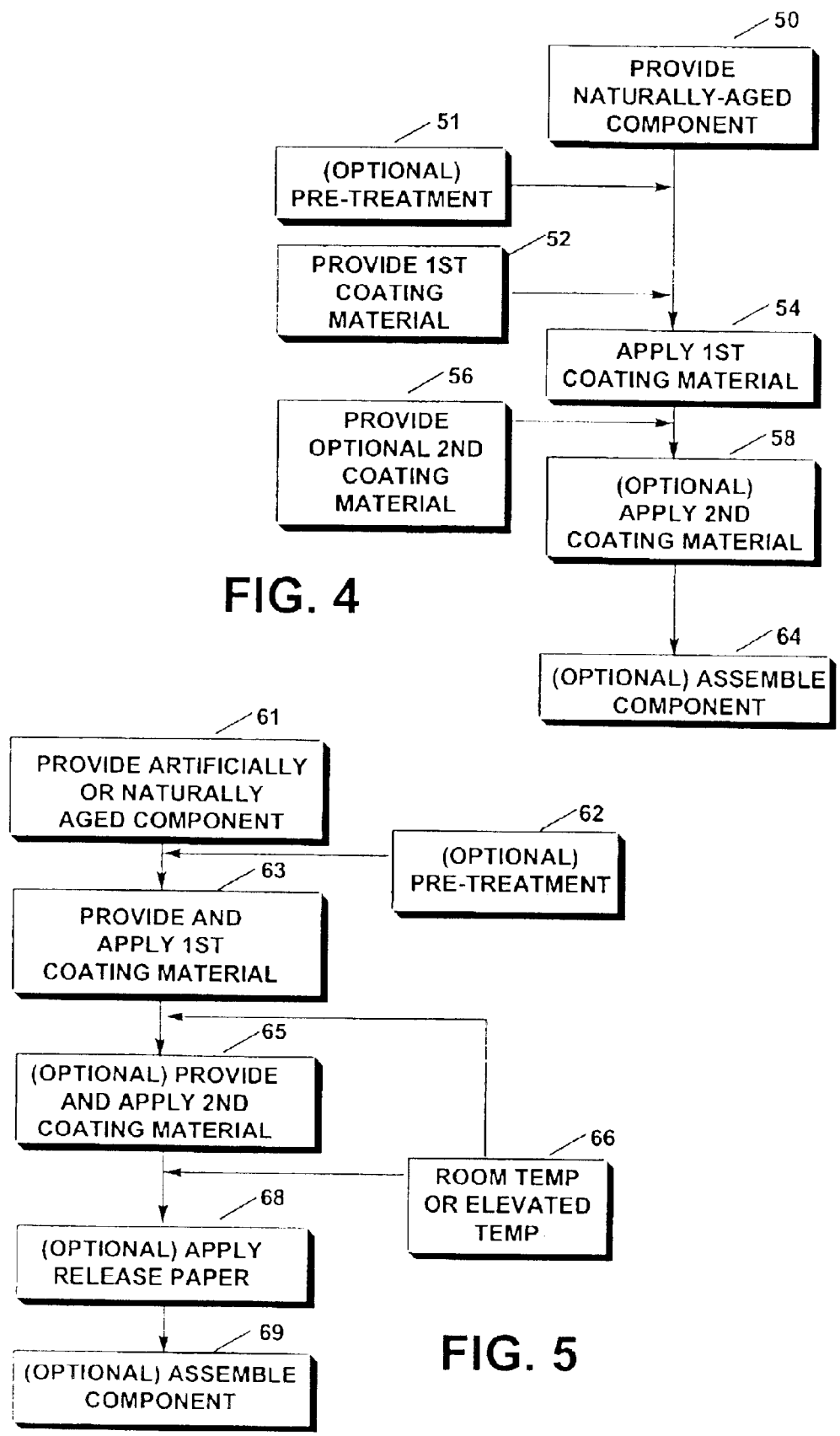

POLYSILOXANE COATINGS FOR SURFACES

CROSS-REFERENCE RELATED APPLICATIONS

This application is a continuation-in-part of U.S. application Ser. No. 10/436,015, filed May 12, 2003, which is a continuation-in-part application of U.S. patent application Ser. No. 10/164,826, filed Jun. 7, 2002, ABN all of which are incorporated by reference herein in their entirety.

FIELD OF THE INVENTION

This invention relates to polymeric coatings and sealants to inhibit corrosion and ice formation on substrates, especially the faying surfaces of a substrate. The invention further relates to compositions and methods of making and applying a polysiloxane-containing composition resistant to corrosion and ice formation or sealant on a faying surface of a substrate.

BACKGROUND OF THE INVENTION

The everyday build-up of ice upon the surfaces of mechanical, physical, and natural objects is a familiar annoyance, and quite often a safety hazard. The slick layers of ice that form on highways, driveways, and walkways make transportation difficult. The masses of ice that accumulate within or upon industrial, agricultural, or other mechanical equipment make operation of the equipment difficult or impossible. And, the weight of ice that weighs upon power lines, buildings, and signs often causes damage to those structures.

Build-up of ice upon the wings and components of an aircraft is of particular concern. The lift generated by the wings, and thus the ability of the aircraft to become and remain airborne, is dependent on the shape of the wings. Even a small accumulation of ice upon the surface of the wings can have a huge aerodynamic effect and can dramatically reduce the ability of the wings to lift the aircraft into the air. Further, ice build-up along control surfaces of the aircraft can impede the movement of those surfaces and prevent proper control of the aircraft.

There are a large variety of techniques used to control the build-up of ice upon the wings and other surfaces of aircraft. For instance, the aircraft may be de-iced before takeoff by application of a chemical spray, which melts the ice from the wings. Such deicing sprays are often toxic and harmful to the environment. The ritual of de-icing is well known to airline passengers traveling through cold environments.

Another method of de-icing aircraft includes providing flexible pneumatic coverings along the leading edges of the wings, and supplying bursts of air or fluid to the wing through the flexible coverings to break away any overlying ice. Similarly, bleeding air from the aircraft engine and routing the heated air to the surface of the wing heats the wing and melts the ice. Finally, ice may be removed from the wing by providing high-current pulses of electricity to a solenoid disposed within the wing that causes the wing to vibrate, fracturing any accumulated ice.

Although the previously mentioned methods of ice removal are generally effective, they require the continuous supply of air, chemicals, or electrical power in order to rid the wing of its burden. It would be preferred, of course, to prevent the accumulation of ice in the first place, but past attempts to develop practical passive methods of ice prevention have failed, along with efforts to reduce moisture penetration, i.e. poor barrier to moisture penetration.

One would expect that known non-stick coatings would be able to prevent ice from adhering to coated surfaces. In fact, aluminum surfaces coated with a Teflon™ material exhibit a zero break force between the ice and the Teflon™ coating. However, upon repeated freezing, the favorable properties exhibited by Teflon™ and similar coatings degrade, resulting in a coating with little or no anti-icing capability.

In addition, there exists a need for an improved approach for the protection of the faying surfaces of aluminum-alloy, aircraft structural components such as wing and fuselage skin panels, stiffeners (which include but are not limited to spars, ribs, stringers, longerons, frames, shear clips, "butterfly" clips, etc.), hinges, doors, etc., and the mechanical components attached to these aforementioned components. Furthermore, there exists a need for improving the delivery methods and systems of such coatings onto the aluminum-alloy, aircraft structural components, including relatively large, surface-area components. Commonly assigned U.S. Pat. No. 6,475,610 discloses such methods and useful coatings for improving the corrosion protection of faying surfaces, and is incorporated by reference herein as if made a part of this present application.

What is needed is a durable surface coating, with long lasting anti-icing properties delivered to coat and protect surfaces, including faying surfaces. What is further needed is a surface coating with anti-icing properties that may be easily applied to the faying surfaces of an aircraft as well as an effective moisture barrier.

SUMMARY OF THE INVENTION

The present invention is directed to a method for applying to a substrate having a faying surface, a polysiloxane-containing coating, preferably a polysiloxane(amide-ureide) coating capable of inhibiting corrosion as well as the accumulation of ice. One embodiment of the present invention is directed to a polysiloxane(amide-ureide) that forms a durable, long lasting, anti-corrosive and anti-ice coating when directed to a substrate faying surface.

Further, the present invention is directed to a substrate having a faying surface coated by a coating made from a material comprising a polymer formed from a combination of two components:—(Component A)–(Component B)— wherein Component A is represented by the formula shown in (Ia):

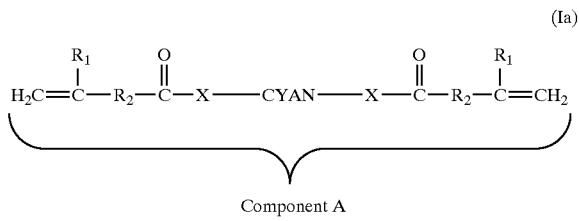

and Component B is represented by either structure, as shown in (Ib) or (Ic):

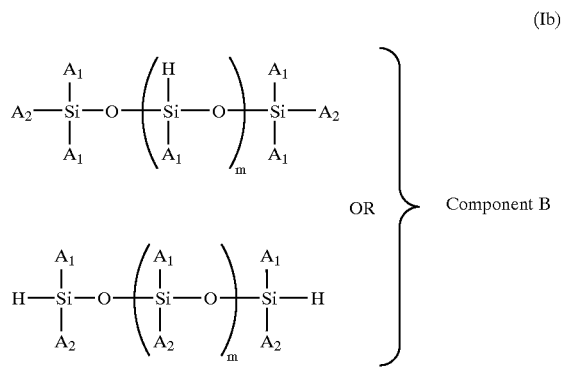

(Ib)

(Ic)

Component B where X is a prepolymer, shown in formula (Id):

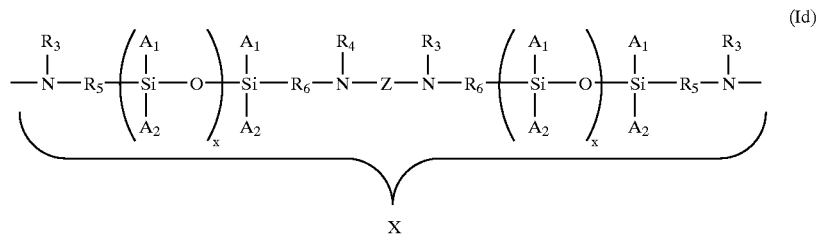

(Id)

wherein $R_1$, $R_3$, and $R_4$ are independently selected from the group consisting of hydrogen; $C_1$ to $C_6$ alkyls and aryls; $C_3$ to $C_6$ cycloaliphatics; and $C_3$ to $C_6$ heterocycles;

$A_1$ and $A_2$ are independently selected from the group consisting of $C_1$ to $C_6$ alkyls and aryls; $C_7$ to $C_{12}$ alkylaryls; $C_3$ to $C_6$ cycloaliphatics; and $C_3$ to $C_6$ heterocycles; and are preferably methyl;

$R_2$, $R_5$, and $R_6$ are independently selected from the group consisting of $C_1$ to $C_{10}$ alkyls; aryls, and heterocycles; wherein the alkyls may be linear or branched, saturated or unsaturated, halogenated or non-halogenated; aryls may be halogenated or non-halogenated; cycloaliphatics may be saturated or unsaturated, halogenated or non-halogenated; heterocycles may be saturated or unsaturated, halogenated or non-halogenated; and alkyaryls may be linear or branched, saturated or unsaturated, halogenated or non-halogenated;

x is a number from 1 to about 10,000, preferably from 1 to about 1000, and most preferably between about 20 and about 200; and, to result in an amine-terminated polysiloxane (amide-ureide), as shown in formula (Ie):

[X]-CYAN-[X]  (Ie)

where X is as shown in (Id), CYAN is a diisocyanate residue from the group of alkyl diisocyanate with the alkyl portion being from $C_1$ to $C_{10}$ and non-linear aryl diisocyanate or non-linear heterocyclic diisocyanate, and Z is a residue of a dicarboxylic acid wherein the hydroxyl from each carboxylic acid component has been replaced with a halide constituent, typically chloride. At least a portion of the substituted dicarboxylic acids is selected from fumaryl, succinyl, phthalyl, terephthalyl, and maleiyl halides, and more preferably fumaryl chlorides and maleiyl chlorides. Subsequently, the moiety (Ie) is reacted with an olefinic acid halide, generally represented by the formula shown in (If), as:

(If)

where $R_3$ is as defined above, and $R_5$ is aliphatic, aryl; $C_3$ to $C_6$ cycloaliphatic; and $C_3$ to $C_6$ heterocyclic; wherein the alkyls may be linear or branched, saturated or unsaturated, halogenated on non-halogenated; aryls may be halogenated or non-halogenated; cycloaliphatics may be saturated or unsaturated, halogenated or non-halogenated; heterocycles may be saturated or unsaturated, halogenated or non-halogenated; and alkyaryls may be linear or branched, saturated or unsaturated, halogenated or non-halogenated; where n is 0 to 10.

BRIEF DESCRIPTION OF THE DRAWINGS

FIG. 1a shows a wing panel substructure.

FIGS. 1b–1f show enlarged partial views of component aspects of the wing panel where faying surfaces occur:

FIG. 1g shows a section of fuselage skin attached to a frame section.

FIG. 2 is a process flow diagram for a method of the invention applying the coating to an artificially-aged alloy.

FIG. 3 is a process flow diagram for another method of the invention comprising a naturally or artificially-aged alloy provided with a pretreatment prior to coating.

FIG. 4 is a process flow diagram for a method of the invention comprising a naturally-aged alloy provided with the coating of the present invention and an optional second coating.

FIG. 5 is a process flow diagram for a method of the invention wherein either a naturally or artificially-aged alloy component comprises a first and an optional second coating with a room or elevated temperature heat treatment step.

DETAILED DESCRIPTION OF THE INVENTION

The present invention now will be described more fully with reference to various embodiments of the invention. This invention may, however, be embodied in many different forms and should not be construed as limited to the embodiments set forth herein; rather, these embodiments are provided so that this disclosure will be thorough and complete, and will fully convey the scope of the invention to those skilled in the art.

The invention is an improved surface coating for inhibiting corrosion and ice formation on a coated faying surface. The surface coating is particularly effective when applied to aluminum, steel, titanium, glass, ceramic, and carbon com posite surfaces and may be particularly useful for inhibiting the formation of ice on the flight and faying surfaces of aircraft or space vehicles. The coating also forms an effective ice inhibitor when used on a wide variety of substrate materials other than the preferred aluminum, titanium or carbon composite. In addition, the coating may be used as the primary, or sole faying surface coating, or may be used as a secondary coating to overcoat another coating.

For the purpose of this application, it is understood that "faying surfaces" are the interfaces of abutting or mating components that become so intimately and permanently fitted in relation to one another that the point of interface is virtually undetectable after assembly. The use of traditional wet-sealant compounds on the faying surfaces of larger aircraft structural components results in additional waste, excessive application and clean-up time, toxic waste disposal complications, and increased cost. In addition, in the past, there have been no known attempts at using the polymer coating of the present invention as anti-corrosive faying surface sealants.

Further, the present invention is directed to a substrate having a faying surface coated by a coating made from a material, and coating methods for applying to such a substrate a material comprising a polysiloxane-containing polymer, preferably a polysiloxane (amide-ureide) coating capable of inhibiting corrosion as well as the accumulation of ice upon the surface of a substrate formed from a combination of two components: —(Component A)–(Component B)— wherein Component A is represented by the formula shown in (Ia):

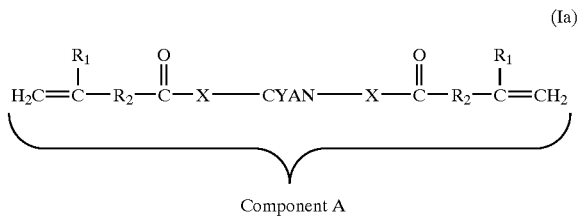

Component A and Component B is represented by either structure, as shown in (Ib) or (Ic):

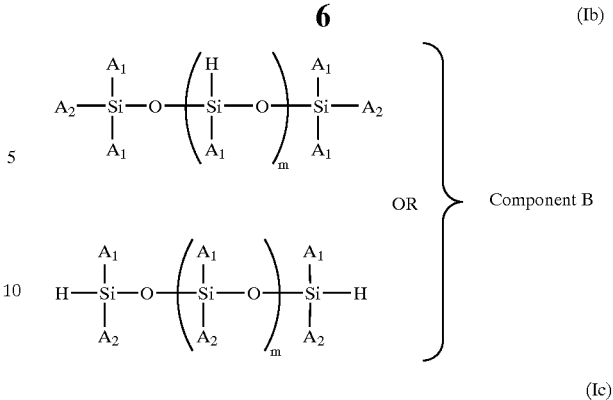

where X is a prepolymer, shown in formula (Id):

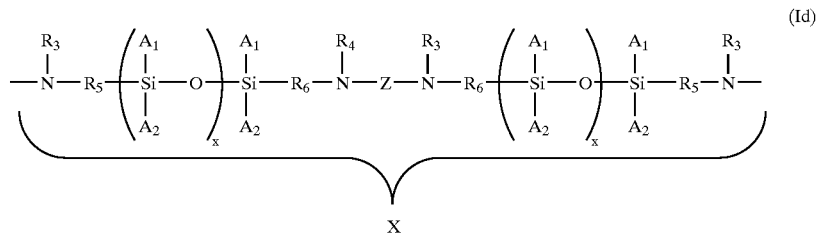

wherein $R_1$, $R_3$, and $R_4$ are independently selected from the group consisting of hydrogen; $C_1$ to $C_6$ alkyls and aryls; $C_3$ to $C_6$ cycloaliphatics; and $C_3$ to $C_6$ heterocycles;

$A_1$ and $A_2$ are independently selected from the group consisting of $C_1$ to $C_6$ alkyls and aryls; $C_7$ to $C_{12}$ alkylaryls; $C_3$ to $C_6$ cycloaliphatics; and $C_3$ to $C_6$ heterocycles; and are preferably methyl;

$R_2$, $R_5$, and $R_6$ are independently selected from the group consisting of $C_1$ to $C_{10}$ alkyls; aryls, and heterocycles;

wherein the alkyls may be linear or branched, saturated or unsaturated, halogenated or non-halogenated; aryls may be halogenated or non-halogenated; cycloaliphatics may be saturated or unsaturated, halogenated or non-halogenated; heterocycles may be saturated or unsaturated, halogenated or non-halogenated; and alkyaryls may be linear or branched, saturated or unsaturated, halogenated or non-halogenated;

x is a number from 1 to about 10,000, preferably from 1 to about 1000, and most preferably between about 20 and about 200; and, to result in an amine-terminated polysiloxane (amide-ureide), as shown in formula (Ie):

$$[X]\text{-CYAN-}[X] \qquad (Ie)$$

where X is as shown in (Id), CYAN is a diisocyanate residue from the group of alkyl diisocyanate with the alkyl portion being from $C_1$ to $C_{10}$ and non-linear aryl diisocyanate or non-linear heterocyclic diisocyanate, and Z is a residue of a dicarboxylic acid wherein the hydroxyl from each carboxylic acid component has been replaced with a halide constituent, typically chloride. At least a portion of the substituted dicarboxylic acids is selected from fumaryl, succinyl, phthalyl, terephthalyl, and maleiyl halides, and more preferably fumaryl chlorides and maleiyl chlorides. Subsequently, the moiety (Ie) is reacted with an olefinic acid halide, generally represented by the formula shown in (If), as:

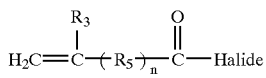

(If)

where $R_3$ is as defined above, and $R_5$ is aliphatic, aryl; $C_3$ to $C_6$ cycloaliphatic; and $C_3$ to $C_6$ heterocyclic; wherein the alkyls may be linear or branched, saturated or unsaturated, halogenated on non-halogenated; aryls may be halogenated or non-halogenated; cycloaliphatics may be saturated or unsaturated, halogenated or non-halogenated; heterocycles may be saturated or unsaturated, halogenated or non-halogenated; and alkyaryls may be linear or branched, saturated or unsaturated, halogenated or non-halogenated; where n is 0 to 10.

The ratio of (Ie) to (If) is two moles of (If) to one mole of (Ie) to result in a product with an unsaturation moiety at the terminal ends of the molecules, as shown in formula (Ia) and which is now called Component A. Subsequently, Component A is reacted with Component B, which is shown as either formula (Ib) or (Ic) in a one mole of A to one mole of B ratio with a platinum catalyst; said catalyst being a platinum-divinyltetramethyldisiloxane complex to result in the fay surface coating; with the platinum catalyst and Component B being obtained from United Chemical Technologies, Inc. (Bristol, Pa.) and where m is an integer from 1 to 1000.

The reaction ideally represented by formula (Ig) involves an addition of the

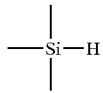

across the olefinic double bond, as shown:

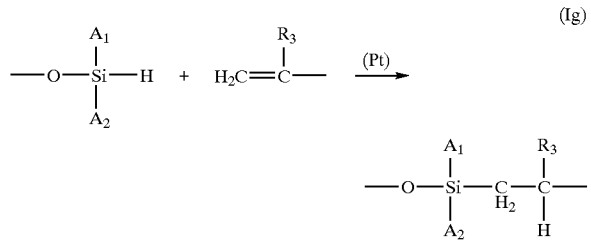

(Ig)

This product of the reaction (Ig), as mentioned above, is now the surface coating with $A_1$ and $A_2$ being independently selected from the group consisting of $C_1$ to $C_6$ alkyls; aryls; $C_7$ to $C_{12}$ alkylaryls; $C_3$ to $C_6$ cycloaliphatics, and $C_3$ to $C_6$ heterocycles; and are preferably methyl;

wherein the alkyls may be linear or branched, saturated or unsaturated, halogenated or non-halogenated; aryls may be halogenated or non-halogenated; cycloaliphatics may be saturated or unsaturated, halogenated or non-halogenated; heterocycles may be saturated or unsaturated, halogenated or non-halogenated.

The beginning diamine-terminated polysiloxane obtained from United Chemical Technologies, Inc. (Bristol, Pa.) has the general formula:

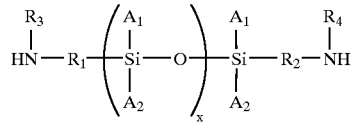

wherein $R_1$, $R_2$, $R_3$, $R_4$, $A_1$, $A_2$, and x are as defined above.

The halide substituted dicarboxylic acid is a low molecular weight dicarboxylic acid wherein the hydroxyl from each carboxylic acid component has been replaced with a halide constituent, typically chloride. At least a portion of the substituted dicarboxylic acids are preferably selected from fumaryl, succinyl, phthalyl, terephthalyl and maleiyl halides, and more preferably fumaryl chlorides and maleiyl chlorides.

To prepare the preferred polymer, two moles of the amine-terminated polysiloxane is first reacted with one mole of a dicarboxylic halide to form a polyamide intermediate (formula (Id)). After formation of the polyamide, two moles of the polyamide is reacted with one mole of a non-linear diisocyanate to form the polysiloxane(amide-ureide) of formula (Ie). Use of fumaryl halides, phthaloyl halides, and maleiyl halides as the dicarboxylic acid halides and use of the non-linear diisocyanate result in a polysiloxane(amide-ureide) with a decidedly non-linear orientation. Thus, the resulting polymer (Ie) contains functional amide groups, functional urea groups, and is amorphous rather than crystalline in nature, due to the non-linear orientation of the polymer molecules. Each of the amide functionality, the urea functionality, and the non-linearity of the polymer improve the polymer's strength or anti-icing properties. Furthermore, the amide/urea moieties create crystallinity within the polymer via intermolecular hydrogen bonding which, in conjunction with the amorphous nature of the polysiloxane and the non-linearity of the diacid or diisocyanate, create a toughened polymer with enhanced physical properties.

The combination of Component A and Component B may be applied in neat form by having Component A and Component B in two separate reservoirs, for example, within a spray gun with the catalyst included in Component A (formula (Ia)). By pressurizing the solutions to about 2500 psi (with a pre-adjusted stoichiometric ratio in each reservoir) and forcing them to mix at the nozzle of a spray gun, such as a Gusmer VH-3000 gun, at ambient or elevated temperature, said temperatures not to exceed 60° C., the reaction between component A and Component B begins immediately upon mixing and deposits on the substrate as a coherent film. For cross-linking purposes, the Component B may contain a mixture of (Ib) and (Ic), such that (Ib) is in slight excess, but still maintaining an equivalent stoichiometry of (Ia) to the total amount of hydride moieties. As an alternative to the neat reaction, the solutions of A and B may be dissolved in a solvent such as a toluene/methylene chloride mixture (1:1 ratio) and the subsequent solutions mixed at the nozzle of the spray gun (as was done in the neat reaction). Upon deposition on the substrate, the solvent will flash off and leave a coherent film on the fay surface.

The present invention relates to using the polysiloxane coatings of the present invention to coat any aircraft structural components such as wing and fuselage skin panels, stiffeners, stringers, spars, clips, frames, etc., where faying surfaces exist. FIG. 1a shows an aircraft wing panel assembly 1 prior to affixing the aluminum skins. The panel assembly 1 comprises hardware shown in enlarged FIGS. 1b–1f. FIG. 1b shows a stringer 2 attached to wing panel skin 7. FIG. 1c depicts a spar cap 3 attached to wing panel skin 7. FIG. 1d shows an angled shear clip 4 in position between stringers 2. FIG. 1e shows a butterfly clip 5 in position adjoining a stringer 2 and a shear clip 4. FIG. 1f shows a center spar clip 6 affixed to a section of wing panel skin 7. Finally, FIG. 1g depicts a section of fuselage structure showing framing 8 affixed to fuselage skin 7. These components preferably have their faying surfaces "precoated" following the completion of their normal fabrication cycle, but prior to final assembly. Large sections of aluminum also could be coated during or after final assembly.

FIG. 2 shows one preferred method of the present invention. In this embodiment, an artificially-aged aluminum-alloy component 10 is optionally pretreated 11. The coating of the present invention is provided 12 and applied to the optionally pretreated component 14. The optional pretreatment step shown in FIGS. 2–5 is preferably a treatment step that would prepare the substrate surface for coating as desired, such as, for example, a ZnNi treatment, a Cd flash treatment, or an anodizing process. The component 10 may or may not be in its final heat-treated state. The component is then optionally assembled in an assembly step 16.

FIG. 3 shows an alternate method of the present invention wherein the coating material is provided 32 and applied 34 to the naturally-aged component 30 prior to an optional component assembly step 36. As in the process of FIG. 2, the component may be optionally pretreated 31 prior to the coating step 34.

FIG. 4 shows another method of the present invention. A naturally-aged, aluminum-alloy component 50 is optionally pretreated 51 and coated with the first coating material of the present invention 54 that has been provided 52. Optionally, a second coating material is provided 56 and applied 58 preferably as an overcoat to the first coating before optional component assembly 64. The overcoat may comprise an adhesive such as a pressure sensitive adhesive and may preferably be applied in an encapsulated state.

In FIG. 5, the component 61 is either an artificially or a naturally-aged alloy in its final heat-treated state. The component is optionally pretreated 62 and then coated with a first coating 63, followed by an optional second coating 65. The component 61 is then cured at room or elevated temperature 66. A releasable film 68 is optionally applied to the component after the second coating is applied. Preferably, the film 68 is removed from the component without disturbing the coatings, prior to optionally positioning and assembling the part 69. It is particularly preferred that at least one of the first and second coatings be encapsulated.

As with the non-linear dicarboxylic acids, the purpose of utilizing a non-linear diisocyanate is to give the resulting polysiloxane(amide-ureide) an overall non-linear orientation, which results in a polymer that is more amorphous and less crystalline. Non-linear aliphatic or aromatic diisocyanates may be used, with ortho- or meta-oriented aromatic diisocyanates being preferred.

The functionality of the diisocyanates is gained from the dual isocyanate groups being located in a non-linear relationship around an aliphatic or aromatic carbon structure. Polyisocyanates, i.e., those compounds having three or more isocyanate groups, may be used for enhanced crosslinking of the resulting polysiloxane(amide-ureide) (Ic). Otherwise, the diisocyanates may be substituted or unsubstituted with groups such as alkyl, alkoxy, halogen, benzyl, allyl, unsubstituted or substituted aryl, alkenyl, alkinyl, amide, or combinations thereof.

Examples of acceptable diisocyanates include 1,5-naphthalene diisocyanate, 4,4-diphenyl-methane diisocyanate, tetra-alkyl-diphenyl methane diisocyanate, 1,3-phenylene diisocyanate, 1,4-phenylene diisocyanate, butane-1,4-diisocyanate, hexamethylene 1,6-diisocyanate, 2,2,4-trimethyl-hexamethylene 1,6-diisocyanate, 2,4,4-trimethyl-hexamethylene 1,6-diisocyanate, tridinediisocyanate, cyclohexane-1,4-diisocyanate, xylilene diisocyanate, dicyclohexyl-methane-4,4'-diisocyanate, methyl-cyclohexane diisocyanate, 1,4-tetramethylene diisocyanate, hexamethylene diisocyanate, 1,3-trimethylene diisocyanate, metaxylene diisocyanate, decamethylene 1,10-diisocyanate, cyclohexylene 1,2-diisocyanate, cyclohexylene 1,4-diisocyanate, 1-methyl cyclohexane 2,4-diisocyanate, 2,4-toluene diisocyanate, hexamethylene-1,6-diisocyanate, heptamethylene-1,7-diisocyanate, 1,3-cyclopentene diisocyanate, and 1,3-cyclohexane diisocyanate, most of which are commercially available from Aldrich™ of Milwaukee, Wis.

The invented polysiloxane(amide-ureide)s of the present invention have several functional aspects which combine to make the polysiloxane(amide-ureide)s superior, durable, and long lasting anti-icing agents which can be used on a wide variety of surfaces. It has been found that the urea groups of the polysiloxane(amide-ureide)s act to disrupt the hydrogen bonding between molecules of water, which inhibits the formation of ice, and also greatly diminishes the adhesion of ice and moisture to the polysiloxane(amide-ureide)s when the polysiloxane(amide-ureide)s are used as a coating layer upon a substrate. As a result, the polysiloxane (amide-ureide)s' anti-icing properties act first to inhibit the formation of ice, and secondly to inhibit the ability of ice and moisture to adhere to a coated surface. The polysiloxane portion of the polymer chain is hydrophobic, hence water does not readily "sheet out", but tends to bead up. The urea moiety, in weakening the hydrogen bonding of the water molecule causes the resultant ice to have a weak structure which prevents water from forming a strong ice crystal layer upon a coating of the polysiloxane(amide-ureide)s, thus allowing it to be easily broken away from the coating.

The polysiloxane(amide-ureide) may be applied as a continuous coating upon a wide variety of surfaces, particularly metal surfaces such as aluminum or titanium. Because the coating is continuous, water cannot penetrate the coating. As mentioned above, it is believed that the penetration of water and moisture into sintered coatings, such as Teflon™, result in the gradual degradation in icephobic properties of such sintered coatings. There is no such related degradation in the invented polysiloxane(amide-ureide).

Thus, the polysiloxane(amide-ureide)s of the present invention have anti-icing properties not previously found in polyamides. Further, such compounds display degradation resistance not previously found in polyureides. Still further, such compounds display physical toughness and durability not previously found in polyamides or polyureides.

Having established the excellent icephobic behavior of polysiloxane (amide-ureide)s, from the foregoing discussion, and their applicability to a faying surface coating, the same chemistry will be incorporated in the Component A used in the faying surface coating. Thus, Component A, as previously defined, will take advantage of the icephobic properties of the polysiloxane (amide-ureide), thereby enabling the faying surface coating to be able to resist separation of mated parts due to the hydrostatic forces encountered by freezing of water. In other words, the reaction product from mixing Component A and Component B, i.e. the addition of

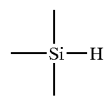

to an unsaturated C=C moiety, e.g. double-bonded or triple-bonded carbon, wherein one of the components, viz., Component A, has the polysiloxane (amide-ureide) as its major moiety, will impart excellent water/ice resistance to the subsequent coating derived therefrom.

A preferred halide-substituted dicarboxylic acid is a low molecular weight dicarboxylic acid wherein the hydrogen from each carboxylic acid component has been replaced with a halide constituent, typically chloride. At least a portion of the substituted dicarboxylic acids is preferably selected from fumaryl, succinyl, phthalyl, terephthalyl, and maleily halides, and more preferably fumaryl chlorides and maleiyl chlorides.

To prepare the preferred polymer of the present invention, two moles of the amine-terminated polysiloxane is first reacted with one mole of a dicarboxylic halide to form an amine-terminated polyamide intermediate (formula (Ie)). After formation of the polyamide, two moles of the polyamide are reacted with one mole of a non-linear diisocyanate to form the polysiloxane (amide-ureide) of said halides, and use of the non-linear diisocyante result in a polysiloxane (amide-ureide) with a decidedly non-linear orientation. Thus, the resulting polymer (If) contains functional amide groups, functional urea groups, and is amorphous rather than crystalline in nature, due to the non-linear orientation of the polymer molecules. Each of the amide functionality, the urea functionality and the non-linearity of the polymer improve the polymer's strength or anti-iciing properties. Furthermore, the amide/urea moieties create crystallinity within the polymer via intermolecular hydrogen bonding which, in conjunction with the amorphous nature of the polysiloxane and the non-linearity of the diacid or diisocyanate, create a toughened polymer with enhanced physical properties.

The polysiloxane(amide-ureide) is particularly useful for application to aluminum or titanium surfaces and provides a coating which may be used to prevent ice formation upon the flight surfaces of an aircraft. The usefulness of the polysiloxane(amide-ureide) is not limited to metal surfaces, however. The polysiloxane(amide-ureide) finds use as a coating on any of a wide variety of substrates such as steel and carbon composites, and even wood or asphalt, a number of which may be applications unrelated to aircraft.

It is contemplated that the polysiloxane-containing coatings used in connection with the present invention may directly contact the faying surface, or may be used as a second coating over a first coating, such as a corrosion-inhibiting coating. These preferred corrosion-inhibiting coatings are those capable of minimizing the passage of moisture, acids, or bases from the environmental surroundings under operational conditions to the aluminum substrate. Thus, such coatings are either hydrophobic materials and/or sacrificial substances, e.g, $SrCrO_4$ or other chromates, etc. Such useful coatings include hydrophobic coatings such as, polyethylene, polyethylene/tetrafluoroethylene copolymers, phenolics, epoxies, polyimides, polyurethanes, polyvinylchlorides, silicones and novolaks, with or without chromate fillers.

A number of curable, organic coating materials are available and may be used in conjunction with the present process to pre-coat or coat the substrate material. One coating material of this type comprises resin mixed with one or more plasticizers, other organic components such as polytetrafluororoethylene, and inorganic additives such as aluminum powder and/or chromates, such as strontium chromate, barium chromate, zinc chromate, and the like. See, for example, U.S. Pat. Nos. 6,475,610; 5,614,037; 6,274,200; 6,494,972; 5,944,918; and 5,858,133.

Novolaks are phenol/formaldehyde polymers that are formed by reacting phenol with less than an equivalent amount of formaldehyde (i.e., approximately 1:0.8 mole ratio) in an acid catalyzed reaction. This results in a more flexible polymer than the standard phenol formaldehyde which allows for ease of handling and application prior to it being further crosslinked at a later stage. Thus, novolaks can be applied to a substrate and later crosslinked by the addition of, for example, hexamethylene tetramine.

The preferred embodiments of the present invention relate to the preparation of the faying surfaces of aircraft structural components, preferably aluminum-alloy components, and the following discussion will emphasize such articles. The use of the invention is not limited to components such as aircraft wing and fuselage skin panels, hinges, doors, etc., and instead is more broadly applicable. However, its use in aircraft structural components offers particular advantages. The procedures and compounds of the present invention in no way inhibit the optimum performance of the alloy components. To the contrary, the present methods allow the components to maintain their optimum mechanical and metallurgical properties while providing equivalent and or improved levels of corrosion protection and pressurizations without the disadvantages associated with the wet-sealant approach. Indeed the present invention is contemplated as being useful with aluminum alloys, ferrous alloys and non-metallic materials that include ceramic-, epoxy-, glass-, wood-, carbon-containing materials, etc.

As used herein, "aluminum-alloy" or "aluminum-base" means that the alloy has more than 50 percent by weight aluminum but less than 100 percent by weight of aluminum. Typically, the aluminum-base alloy has from about 85 to about 98 percent by weight of aluminum, with the balance being alloying elements, and a minor amount of impurity. Alloying elements are added in precisely controlled amounts to predictably modify the properties of the aluminum alloy. Alloying elements that are added to aluminum in combination to modify its properties include, for example, magnesium, copper, and zinc, as well as other elements. Additional corrosion- and heat-resistant alloys contemplated for use with the coatings of the present invention include Monel 400, Monel K-500, A-286 and Inconel 600, and stainless steels such as 302, 303, 304, 305, 410, 416, 430, Custom 450, and 17-4PH.

In one embodiment, the aluminum alloy is heat-treatable. For aircraft structural components having faying surfaces such as wing and fuselage skin panels, stiffeners, frames, doors, hinges, etc., it is preferred that such components would have their faying surfaces "pre-coated" following the completion of their normal fabrication cycle but prior to final assembly, although coating of large sections of aluminum also could be coated during or after final assembly. The component such as a wing skin panel or wing skin panel stiffener such as a stringer is first fabricated to a desired shape. The alloying elements are selected such that the fabricated shape may be processed to have a relatively soft state, preferably by heating it to an elevated temperature for a period of time and thereafter quenching it to a lower temperature. This process is termed "solution heat-treating" or "annealing." In the solution heat-treating/annealing process, solute elements are dissolved into the alloy matrix (i.e., solution-treating) and retained in solution by the rapid quenching, and the matrix itself is simultaneously annealed.

After the component is solution-treated/annealed, it may be further processed to increase its strength several fold to have desired high-strength properties. Such further processing, typically by a precipitation-hardening/aging process, may be accomplished either by heating to an elevated temperature for a period of time (termed artificial-aging) or by holding at room temperature for a longer period of time (termed natural-aging). In conventional, Aluminum Association terminology, different artificial-aging, precipitation heat-treatments (some in combination with intermediate deformation or cold working), produce the basic T6, T7, T8, or T9 temper conditions. A natural-aging precipitation treatment produces the basic T3 or T4 temper conditions. Aluminum Association terminology for heat-treatments, alloy types, and the like are understood by those skilled in the metallurgical field, and will be used herein. Some alloys require artificial-aging and other alloys may be aged in either fashion. The treated structural components of the present invention are commonly made of both types of materials.

In both types of aging, strengthening occurs as a result of the formation of second-phase particles, typically termed precipitates, in the aluminum-alloy matrix. Collectively, all of the processing steps leading to their strengthening are generally termed "heat-treating", wherein the component is subjected to one or more periods of exposure to an elevated temperature for a duration of time. Heating and cooling rates are selected to aid in producing the desired final properties. The temperatures, times, and other parameters required to achieve particular properties are known to those skilled in the field of aluminum-base alloys and metallurgy.

The 7150 alloy is a specific, artificially-aged, aluminum-base alloy of particular interest for aircraft structural applications. The 7150 alloy has a composition of about 2.2 percent by weight copper, about 2.3 percent by weight magnesium, 6.4 percent by weight zinc, about 0.12 percent by weight zirconium and balance of aluminum plus minor impurities. Other suitable alloys include, but are not limited to, 2000, 4000, 6000, and 7000 series heat-treatable aluminum alloys. The 7150 alloy is available commercially from several aluminum companies, including ALCOA, Reynolds, Pechiney, and Kaiser.

After the component is fabricated to the desired shape, the 7150 alloy is fully solution-treated/annealed to have an ultimate tensile strength of about 42,000 pounds per square inch (psi) and yield strength of about 24,000 psi with an ultimate elongation of about 12% or as otherwise required. This state is usually obtained following the component's fabrication processing including machining, forging, or otherwise forming the component into the desired shape. This condition is termed the "untreated state" herein, as it precedes the final aging/precipitation heat-treatment cycle required to optimize the strength and other properties of the material. The component may be subjected to multiple forming operations and is periodically re-annealed as needed, prior to the strengthening, precipitation heat-treatment process. After forming (and optionally re-annealing), the 7150 alloy may be heat-treated at a temperature of about 250° F. for about 24 hours.

An alternative two-stage heat treatment may be used. This treatment is comprised of first heat-treating the component at a temperature of about 225° F. from about 6 hours to about 8 hours. The temperature is thereafter increased from about 250° F. to about 350° F. for a period from about 6 hours to about 10 hours, followed by an ambient air cool. This final state of heat-treatment, termed T77511 condition, produces a strength of from about 82,000 psi to about 89,000 psi in the 7150 alloy, which is suitable for aircraft structural component applications.

It is understood that additional, optional pre-treatment steps, such as ZnNi treatment, Cd flash treatment, or anodizing processes may be inserted into the above-described preferred methods. In one particularly preferred optional pre-treatment step, the component is initially optionally chemically-etched, grit-blasted or otherwise processed to roughen its surface, and thereafter anodized in chromic-acid solution. Chromic-acid solution is available commercially or prepared by dissolving chromium trioxide in water. The chromic-acid solution is preferably of a concentration of about 4 percent chromate in water, and at a temperature of from about 90° F. to about 100° F. The article or component to be anodized becomes the anode in the mildly agitated chromic-acid solution at an applied DC voltage of from about 18 volts to about 22 volts. Anodizing is preferably continued for from about 30 minutes to about 40 minutes, but shorter times were also found to be sufficient. The anodizing operation produces a strongly adherent oxide surface layer from about 0.0001 inches to about 0.0003 inches thick on the aluminum-alloy article, which surface layer promotes the adherence of the subsequently applied first organic coating.

The optional anodizing process, preferably in chromic acid, conducted prior to application of the coating serves to promote strong chemical and mechanical bonding of the organic coating to the aluminum-alloy article substrate. The bonding is apparently promoted both by physical, mechanical interlocking and chromate-activated, chemical bonding effects. To enhance the physical, mechanical interlocking effect, the anodized surface is not chemically-sealed against further water intrusion after the anodizing process. When a first coating on the faying surfaces is desired, such a cured organic coating serves to seal the anodized surface.

As set forth in copending and commonly assigned U.S. Pat. No. 6,475,610 the first coating material described above is preferably provided in about 100% low-viscosity solid solution or "neat" material so that it may be readily and evenly applied. The usual function of the coating material is to protect the base metal to which it is applied from corrosion, including, for example, conventional electrolytic corrosion, galvanic corrosion, and stress corrosion. The preferred first coating material is a formulation primarily comprising an organic composition, but also may contain additives to improve the properties of the final coating. The coating may also be desirably dissolved initially in a carrier liquid and encapsulated. After application, the coating material is subjected to an environmental change of temperature and/or pressure to rupture the encapsulation. The coating is thus released to the component's substrate surface where it is subsequently cured to effect structural changes within the organic coating, typically cross-linking organic molecules to improve the adhesion and cohesion of the coating.

The installation step reflects one of the advantages of the present invention. If the coatings were not applied to the component before assembly, it would be necessary to place a viscous, wet-sealant material onto the faying surfaces to coat the contacting surfaces as the mating components are either assembled, installed, or joined. The wet-sealant material is potentially toxic to workers, messy and difficult to work with, and necessitates extensive cleanup (of both tools and the exposed surfaces of the resulting aircraft section) with caustic chemical solutions after component installation. Moreover, it has been observed that the presence of residual, wet-sealant inhibits the adhesion of later-applied paint or other top coats onto the assembled components. The present coating approach overcomes these problems, along with providing a superior barrier to moisture. As a result of the present invention, wet-sealant is not needed or used during installation and consequent joining or assembly.

Further, it is highly advantageous to apply the protective surface coating of the present invention to aluminum-alloy, aircraft structural components to facilitate automated part assembly and inspection. The present invention further enhances the integrity, consistency, and performance of aircraft faying and other surfaces, as well as improving existing part storage, general handling, installation, and assembly systems, while also reducing manufacturing cycle time. In short, the present invention allows for the coated components to retain all mechanical and metallurgical properties, and the required degree of corrosion protection, without any of the disadvantages of the conventional wet sealant corrosion treatments.

The following examples serve only to further illustrate aspects of the present invention and should not be construed as limiting the invention.

EXAMPLE 1

The reaction between a high molecular weight diamine-terminated polysiloxane, dissolved in methylene chloride, with a tertiary amine, e.g., triethylamine, as an acid acceptor, and fumaryl chloride in a molar ratio of 2:1 resulted in the formation of a diamine-terminated poly (siloxane diamide).

The tertiary amine hydrochloride was filtered off and the resultant diamide was reacted with toluene-2,4-diisocyanate in a 1:1 molar ratio of diamide to diisocyanate to form a polysiloxane(amide-ureide) with repeated trans structure about the double bond of the fumaryl moiety. The ratio of amine-terminated poly(siloxane amide) to isocyanate was dictated by the functionality of the isocyanate, i.e., a tri-isocyanate would require two moles of the poly(siloxane amide) to one mole of tri-isocyanate.

EXAMPLE 2

Into a two liter, three-necked round bottom flask was added one mole of fumaryl chloride dissolved in 500 mils of methylene chloride. A dry, inert atmosphere was maintained by means of a drying tube and nitrogen purge. To this solution was added, slowly and with stirring, two moles of α,ω-diaminopolysiloxane, MW 26,000, dissolved in 500 mils of methylene chloride and containing two moles of triethylamine as an acid acceptor. After the addition was completed, the mixture was heated to 50° C. for one hour and the amine hydrochloride was filtered off, leaving the amine-terminated fumaryl polyamide in solution. The one mole of polyamide was added to one mole of 2,4-toluene diisocyanate dissolved in 100 mils of methylene chloride with a precaution of maintaining a dry, inert atmosphere. After allowing the reaction to proceed for 24 hours at room temperature, the methylene chloride solution of the polysiloxane(amide-ureide) was ready to be used as a coating material on the substrate needing ice protection. This is Sample C used in the ice testing shown in Table 1 below.

EXAMPLE 3

One mole of succinyl chloride, one mole of fumaryl chloride, and four moles of amine-terminated polydimethylsiloxane were reacted to yield polyamides with a trans amide component around the double bond of the fumaryl moiety and a linear amide component around the single bond of the succinyl moiety. Thus, the linearity of the polyamide may be adjusted prior to reaction with the diisocyanate by controlling the relative amounts of saturated and unsaturated acid halide, i.e. the relative amounts of fumaryl chloride versus succinyl chloride.

EXAMPLE 4

Two moles of fumaryl chloride and one mole of propylamine-terminated polydimethylsiloxane were reacted. The product was reacted with two moles of butylamine-terminated polydimethylsiloxane. That product was then reacted with one mole of toluene-2,4-diisocyanate to result in a block copolymer polysiloxane(amide-ureide).

EXAMPLE 5

Two moles of α,ω-diaminopolydimethylsiloxane (MW 26,000) was reacted with one mole of fumaryl chloride under conditions as described in Example 2 to form a first product. One mole of toluene-2,4-diisocyanate was reacted with two moles of α,ω-diaminopolydimethylsiloxane (MW 2,300) under conditions as described in Example 2 to form a second product. These products (each amine-terminated) were then reacted with two moles of fumaryl chloride to result in a block copolymer(amide-ureide). This is Sample D used in ice testing shown in Table 1. See below.

EXAMPLE 6

To prepare Component A, two moles of α,ω-diaminopolysiloxane were dissolved in one liter of methylene chloride, containing two moles of a tertiary amine, such as triethylamine as an acid acceptor, and one mole of an acid dihalide, such as fumaryl chloride, added under inert atmosphere to the diaminopolysiloxane. After the addition was completed, the mixture was heated to 50° C. for one hour and the amine hydrochloride filtered off, leaving the amine-terminated fumaryl polyamide in solution. Two moles of the amine-terminated polysiloxane/amide was then added to one mole of a diisocyanate, such as 2,4-toluene diisocyanate, under inert atmosphere conditions. After allowing the reaction to proceed for 24 hours at room temperature, the resultant amine-terminated polysiloxane (amide/ureide) was now ready for reaction with an unsaturated acid halide, such as acryloyl chloride or methacryloyl chloride or vinyl benzoyl chloride.

Two moles of the unsaturated acid chloride was added to one mole of the amine-terminated polysiloxane (amide/ureide) in the presence of a tertiary amine as an acid-acceptor. After the addition of the acid chloride to the amine-terminated polysiloxane (amide/ureide) was completed, the amine hydrochloride was filtered off and the resultant vinyl-terminated amide polysiloxane (amide/ureide) was now Component A and ready to be used either in solution or as a neat material after removing the solvent under vacuum.

EXAMPLE 7

The combination of Component A and Component B may be applied in neat form to a fay surface or any other surface, by having Component A and Component B in two separate reservoirs of a spray gun with the catalyst dissolved in Component A. The catalyst is a platinum divinyltetramethyldisiloxane complex (obtained from United Chemical Technologies, Inc.—Bristol, Pa.). Component B, a polysiloxane-hydride terminated or polyhydrosiloxane (with hydrogen attached to silicon along the polymer chain, may be obtained from United Chemical Technologies, Inc. or Dow Chemical Co., Midland, Mich.).

By heating the solutions to 60° C. and pressurizing the solutions to about 2500 psi (with a pre-adjusted stoichiometric ratio in each reservoir) and forcing them to mix at the nozzle of a spray gun such as a Gusmer VH-3000 gun, at the elevated temperature, the reaction between Component A and Component B begins immediately upon mixing and deposits on the substrate as a coherent film. For crosslinking purposes, the Component B may contain mixtures of (Ic) and (Ib) such that (Ic) is in slight excess, but still maintaining an equivalent stoichiometry of (Ia) (Component A) to the total amount of hydride moieties (Component B). Alternative to the neat reaction, the solutions of Component A and Component B may be dissolved in a solvent such as a toluene/methylene chloride mixture (1:1 ratio) and the subsequent solutions mixed at the nozzle of the spray gun (as was done in the neat reaction). Upon deposition on the substrate, the solvent will flash off and leave a coherent film on the faying surface.

EXAMPLE 8

Ice adhesion tests were performed by freezing ice between two surfaces of a temperature controlled Instron tester and then forcing the surfaces apart until the ice reached cohesive or adhesive failure. According to this testing method, an upper aluminum plate and lower aluminum plate are positioned directly opposite and facing one another. The lower plate is coated with a sealing layer. Water is then positioned between the upper plate and the coating layer where it is allowed to freeze into a solid ice layer in a temperature controlled chamber chilled to 20° F. The aluminum plates were pulled apart at a rate of 0.02 in/min from one another under carefully measured conditions until the ice separates from one of the surfaces, or suffers adhesive failure. The tension at separation is noted. The type of ice failure (adhesive vs. cohesive) is also noted. For this example, four different substances were tested in the temperature-controlled Instron™ test machine. The results are shown in Table 1 below. The samples were as follows:

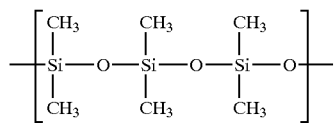

MW = approx. 500,000

A. Silicone Rubber

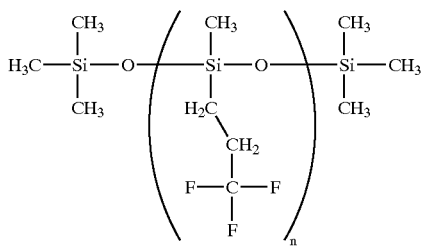

n = approx. 4600 MW

B. Fluorinated Silicone

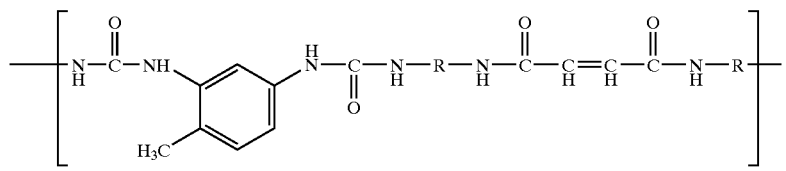

C. Polysiloxane (amide-ureide)

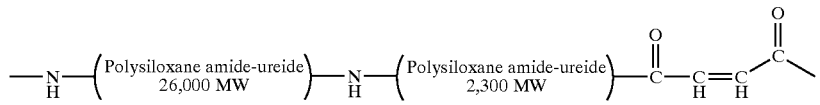

D. Polysiloxane (amide-ureide)

TABLE 1

| Surface | Ice Thickness (in.) | Breakforce (lb./in²) | Number of Runs | Standard Deviation | Adhesive/ Cohesive Failure (%) |
|---|---|---|---|---|---|
| A | 0.03 | 7 | 3 | 3.4 | 100/0 |
|   | 0.01 | 5 | 3 | 0.6 | 100/0 |
| B | 0.03 | 91 | 5 | 52.8 | 10/90 |
|   | 0.01 | 9 | 3 | 10.1 | 97/3 |
| C | 0.03 | 5 | 3 | 0.58 | 100/0 |
|   | 0.01 | 10 | 4 | 2.6 | 100/0 |
| D | 0.03 | 0 | 3 | 0 | 100/0 |
|   | 0.01 | 2 | 3 | 2.6 | 100/0 |

As shown, the polysiloxane(amide-ureide) Samples C and D had very favorable ice release characteristics, releasing at 5 lb/in² and 0 lb/in² respectively for ice thicknesses of 0.03 inches, and 10 lb/in² and 2 lb/in² respectively for ice thickness of 0.01 inches. Note that the silicone rubber coating A had very favorable ice shedding characteristics, but silicone rubber does not form a tough coating and is unsuitable for application to aircraft surfaces, etc. The polysiloxane(amide-ureide)s of the present invention show significantly better ice shedding characteristics compared with the fluorinated siloxane samples, which are typically considered to be highly icephobic.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A coating for use on a component surface, said coating comprising a polymer comprising Component A and Component B, wherein Component A is a compound comprising the formula:

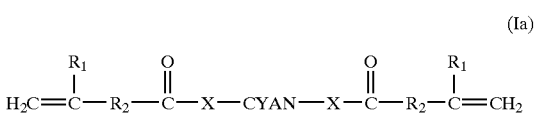

(Ia)

and wherein Component B is a compound comprising the formula:

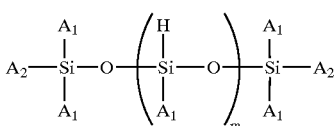

(Ib)

or a compound comprising the formula:

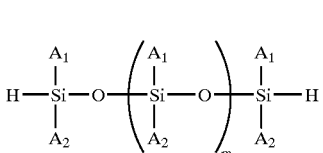

(Ic)

wherein X is a prepolymer comprising the formula:

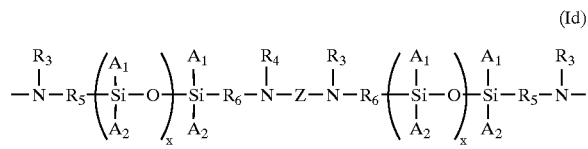
(Id)

wherein $R_1$, $R_3$, and $R_4$ are independently selected from the group consisting of hydrogen; $C_1$ to $C_6$ alkyls and aryls; $C_3$ to $C_6$ cycloaliphatics; and $C_3$ to $C_6$ heterocycles;

$A_1$ and $A_2$ are independently selected from the group consisting of $C_1$ to $C_6$ alkyls and aryls; $C_7$ to $C_{12}$ alkylaryls; $C_3$ to $C_6$ cycloaliphatics; and $C_3$ to $C_6$ heterocycles;

$R_2$, $R_5$, and $R_6$ are independently selected from the group consisting of $C_1$ to $C_{10}$ alkyls; aryls, and heterocycles;

m and x are each a number from 1 to about 10,000;

CYAN is a diisocyanate residue; and

Z is a halide-substituted dicarboxylic acid residue.

2. The coating of claim 1, wherein the diisocyanate is selected from the group consisting of alkyl diisocyanate, wherein the alkyl portion is from $C_1$ to $C_{10}$; non-linear aryl diisocyanate; and non-linear heterocyclic diisocyanate.

3. The coating of claim 1, wherein at least a portion if the substituted dicarboxylic acid is selected from the group consisting of fumaryl halides, succinyl halides, phthalyl halides, terephthalyl halides, and maleiyl halides.

4. The coating of claim 1, wherein the component comprises an aircraft component.

5. The coating of claim 1, wherein the component surface comprises a faying surface.

6. A substrate comprising a surface coated with a coating, said coating comprising a polymer, said polymer comprising a Component A and a Component B, wherein Component A is a compound comprising the formula:

(Ia)

and wherein Component B is a compound comprising the formula:

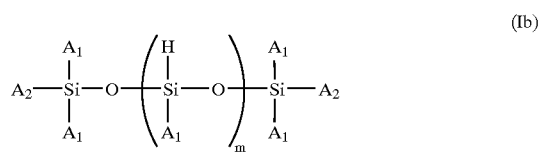
(Ib)

or a compound comprising the formula:

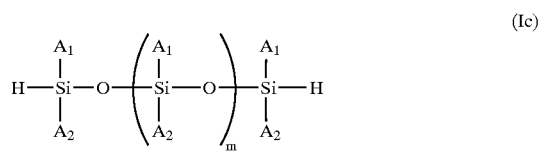
(Ic)

wherein X is a prepolymer comprising the formula

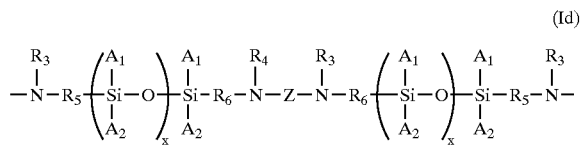
(Id)

wherein $R_1$, $R_3$, and $R_4$ are independently selected from the group consisting of hydrogen; $C_1$ to $C_6$ alkyls and aryls; $C_3$ to $C_6$ cycloaliphatics; and $C_3$ to $C_6$ heterocycles;

$A_1$ and $A_2$ are independently selected from the group consisting of $C_1$ to $C_6$ alkyls and aryls; $C_7$ to $C_{12}$ alkylaryls; $C_3$ to $C_6$ cycloaliphatics; and $C_3$ to $C_6$ heterocycles;

$R_2$, $R_5$, and $R_6$ are independently selected from the group consisting of $C_1$ to $C_{10}$ alkyls; aryls, and heterocycles;

m and x are each a number from 1 to about 10.000;

CYAN diisocyanate residue; and

Z is a halide-substituted dicarboxylic acid residue.

7. The substrate of claim 6, wherein the diisocyanate is selected from the group consisting of alkyl diisocyanate, wherein the alkyl portion is from $C_1$ in $C_{10}$; non-linear aryl diisocyanate; and non-linear heterocyclic diisocyanate.

8. The substrate of claim 6, wherein at least a portion of the substituted dicarboxylic acid is selected from the group consisting of fumaryl halides, succinyl halides, phthalyl halides, terephthalyl halides, and maleiyl halides.

9. The substrate of claim 6 wherein the dicarboxylic component is selected from fumaryl moieties, maleiyl moieties, saturated $C_4$ to $C_8$ dicarboxylic moieties, and partially-saturated $C_4$ to $C_8$ dicarboxylic moieties.

10. The substrate of claim 6, wherein greater than approximately 50 mol % of the dicarboxylic component of the polymer comprises fumaryl moieties.

11. The substrate of claim 6, wherein greater than approximately 80 mol % of the dicarboxylic component of the polymer comprises fumaryl moieties.

12. The substrate of claim 6, wherein $R_1$ and $R_2$ are independently selected from the group consisting of methyl, ethyl, propyl, butyl, and phenyl, moieties.

13. The substrate of claim 6, wherein at least one of $R_1$ and $R_2$ are selected from the group consisting of halogenated alkyls and halogenated aryls.

14. The substrate of claim 6, wherein $A_1$ and $A_2$ are independently selected from the group consisting of methyl, ethyl, propyl, butyl, and phenyl moieties.

15. The substrate of claim 6, wherein at least one of $A_1$ and $A_2$ are selected from the group consisting of halogenated alkyls, halogenated aryls, halogenated alkylaryls, halogentated cycloaliphatics, and halogenated heterocycles.

16. The substrate of claim 6, wherein the diisocyanate component comprises an aromatic diisocyante.

17. The substrate of claim 6, wherein the diisocyanate component comprises toluene-2,4-diisocyanate.

18. The substrate of claim 6, wherein the diisocyanate component comprises a saturated aliphatic diisocyanate.

19. The substrate of claim 6, wherein x is a number from 1 to about 1000.

20. The substrate of claim 6, wherein x is a number from about 20 to about 200.

21. The substrate of claim 6, wherein the substrate comprises an aircraft component.

22. The substrate of claim 6, wherein the surface comprises a faying surface.

23. The substrate of claim 6, wherein the coating inhibits the ability of ice to adhere to a surface of the aircraft component surface.

24. The substrate of claim 6, wherein the coating inhibits the ability of moisture to adhere to a surface of the aircraft component surface.

25. The substrate of claim 6, wherein the substrate further comprises a subsequent coating applied to the polymer coating.

26. The substrate of claim 6, wherein the substrate further comprises a pre-treatment applied to the substrate surface.

27. The substrate of claim 26, wherein the pre-treatment is selected from the group consisting of ZnNi pre-treatment, Cd flash pre-treatment, and an anodizing pre-treatment process.

28. The substrate of claim 6, wherein the substrate further comprises a first coating applied to the substrate, with the polymer coating applied to the first coating as a secondary coating.

29. The substrate of claim 28, wherein the first coating comprises a curable organic coating material selected from the group consisting of phenolics, urethanes, epoxies, and melamines.

30. The substrate of claim 28, wherein the first coating comprises a curable organic coating material selected from the group consisting of polyurethanes, polyvinyl chlorides, silicones, epoxides, acrylates, polyimides, and phenolics.

31. The substrate of claim 6, wherein the substrate is made from a material selected from the group consisting of: aluminum alloys, ferrous alloys, and non-metallic materials.

32. The substrate of claim 31, wherein the non-metallic material is selected from the group consisting of ceramic-, epoxy-, glass-, wood-, and carbon-containing materials.

33. The substrate of claim 6, wherein the substrate comprises an aluminum-alloy aircraft component.

34. The substrate of claim 28, wherein the substrate comprises an aluminum-alloy aircraft component.

35. An aircraft comprising the substrate of claim 6.

36. An aircraft comprising the substrate of claim 28.

37. A method for coating the surface of a component with a corrosion-inhibiting coating comprising the steps of:

providing a component having a surface;

providing a coating material, said coating material comprising a polymer comprising Component A and Component B, wherein Component A is a compound comprising the formula:

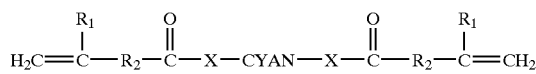

(Ia)

and wherein Component B comprises a compound comprising the formula:

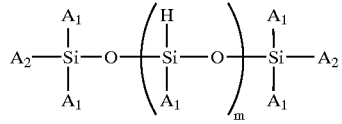

(Ib)

or a compound comprises the formula:

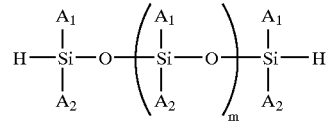

(Ic)

wherein X is a prepolymer comprising the formula:

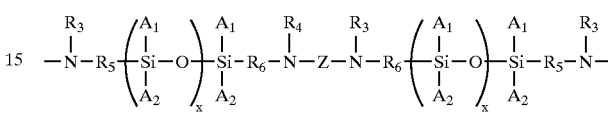

(Id)

wherein $R_1$, $R_3$, and $R_4$ are independently selected from the group consisting of hydrogen; $C_1$ to $C_6$ alkyls and aryls; $C_3$ to $C_6$ cycloaliphatics; and $C_3$ to $C_6$ heterocycles;

$A_1$ and $A_2$ are independently selected from the group consisting of $C_1$ to $C_6$ alkyls and aryls; $C_1$ to $C_{12}$ alkylaryls; $C_3$ to $C_6$ cycloaliphatics; and $C_3$ to $C_6$ heterocycles;

$R_2$, $R_5$, and $R_6$ are independently selected from the group consisting of $C_1$ to $C_{10}$ alkyls; aryls; and heterocycles;

m and x are each a number from 1 to about 10,000;

CYAN is a diisocyanate residue;

Z is a halide-substituted dicarboxylic acid residue; and applying the polymer coating to the surface.

38. The method of the claim 37, wherein the dicarboxylic component is selected from fumaryl moieties, maleiyl moieties, saturated $C_4$ to $C_8$ dicarboxylic moieties, and partially-saturated $C_4$ to $C_8$ dicarboxylic moieties.

39. The method of claim 37, wherein greater than approximately 50 mol % of the dicarboxylic component of the polymer comprises fumaryl moieties.

40. The method of claim 37 wherein greater than approximately 80 mol % of the dicarboxylic component of the polymer comprises fumaryl moieties.

41. The method of claim 37, wherein $R_1$ and $R_2$ are independently selected from the group consisting of methyl, ethyl, propyl, butyl, and phenyl moieties.

42. The method of claim 37, wherein at least one of $R_1$ and $R_2$ are selected from the group consisting of halogenated alkyls and halogenated aryls.

43. The method of claim 37, wherein $A_1$ and $A_2$ are independently selected from the group consisting of methyl, ethyl, propyl, butyl, and phenyl moieties.

44. The method of claim 37, wherein at least one of $A_1$ and $A_2$ are selected from the group consisting of halogenated alkyls, halogenated aryls, halogenated alkylaryls, halogenated cycloaliphatics, and halogenated heterocycles.

45. The method of claim 37, wherein the diisocyanate component comprises an aromatic diisocyante.

46. The method of claim 37, wherein the diisocyanate component comprises toluene-2,4-diisocyanate.

47. The method of claim 37, wherein the diisocyanate component comprises a saturated aliphatic diisocyanate.

48. The method of claim 37, wherein x is a number from 1 to about 1000.

49. The method according to claim 37, wherein x is a number from about 20 to about 200.

50. The method of claim 37, further comprising the steps of providing a first coating between the component surface and the polymer coating.

51. The method of claim 50, wherein the first coating comprises a curable organic coating material selected from the group consisting of phenolics, urethanes, epoxies, and melamines.

52. The method of claim 50, wherein the first coating comprises a curable organic coating material selected from the group consisting of polyurethanes, polyvinyl chlorides, silicones, epoxides, acrylates, polyimides, and phenolics.

53. The method according to claim 37, wherein the component comprises an aircraft component.

54. The method of claim 37, wherein the component is made from a material selected from the group consisting of: aluminum alloys, ferrous alloys, and non-metallic materials.

55. The method of claim 37, further comprising the step of applying a second coating to the polymer coating.

56. The method of claim 37, further comprising the step of applying a pre-treatment to the component surface.

57. The substrate of claim 37, wherein the pre-treatment is selected from the group consisting of a ZnNi pre-treatment and an anodizing pre-treatment.

58. The method of claim 37, wherein the surface comprises a faying surface.

59. An aircraft comprising components comprising surfaces coated according to the method of claim 37.

60. An aircraft comprising components comprising surfaces coated according to the method of claim 50.

61. The method of claim 37, wherein the coating inhibits the ability of ice to adhere to a component surface.

62. The method of claim 37, wherein the coating inhibits the ability of moisture to adhere to a component surface.

63. The method of claim 50, wherein the coating inhibits the ability of ice to adhere to a surface of the aircraft component surface.

64. The method claim 50, wherein the coating inhibits the ability of moisture to adhere to a surface of the aircraft component surface.

* * * * *